United States Patent
Okada

(10) Patent No.: US 10,436,406 B2
(45) Date of Patent: Oct. 8, 2019

(54) VEHICLE LAMP FITTING

(71) Applicant: HONDA MOTOR CO., LTD., Minato-ku, Tokyo (JP)

(72) Inventor: Naoyuki Okada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/080,683

(22) PCT Filed: Feb. 15, 2017

(86) PCT No.: PCT/JP2017/005517
§ 371 (c)(1),
(2) Date: Aug. 29, 2018

(87) PCT Pub. No.: WO2017/159189
PCT Pub. Date: Sep. 21, 2017

(65) Prior Publication Data
US 2019/0093847 A1 Mar. 28, 2019

(30) Foreign Application Priority Data

Mar. 17, 2016 (JP) ................................. 2016-054328

(51) Int. Cl.
*F21S 41/20* (2018.01)
*F21S 43/00* (2018.01)
(Continued)

(52) U.S. Cl.
CPC ........... *F21S 41/285* (2018.01); *F21S 41/148* (2018.01); *F21S 41/365* (2018.01); *F21S 43/00* (2018.01);
(Continued)

(58) Field of Classification Search
CPC ...... F21S 41/285; F21S 43/249; F21S 41/365; F21S 43/14; F21S 43/243; F21S 41/148;
(Continued)

(56) References Cited

U.S. PATENT DOCUMENTS

2008/0013333 A1* 1/2008 Koizumi ............. B60Q 1/2696
362/511
2009/0284365 A1* 11/2009 Wagner ................ B60Q 1/2665
340/465
(Continued)

FOREIGN PATENT DOCUMENTS

| JP | 2012-206597 | 10/2012 |
|----|-------------|---------|
| JP | 2014-154522 | 8/2014  |
| JP | 2015-167124 | 9/2015  |

OTHER PUBLICATIONS

International Search Report and Written Opinion for International Patent Application No. PCT/JP2017/005517 dated May 16, 2017, 7 pages.

*Primary Examiner* — Bao Q Truong
(74) *Attorney, Agent, or Firm* — Amin, Turocy & Watson LLP

(57) ABSTRACT

This vehicle lamp fitting (10) includes a plurality of arranged light sources (12) and a light guide body (11) into which light from the plurality of light sources (12) is introduced. The light guide body (11) includes a light entry section (15) into which the light from the plurality of light sources (12) is incident; a light exit surface (11a) extending in an arrangement direction of the plurality of light sources (12); a step-shaped first lens cut section (21) provided between the light entry section (15) and the light exit surface (11a) and extending in the arrangement direction; and a step-shaped second lens cut section (22) provided between
(Continued)

the first lens cut section (21) and the light exit surface (11a) and extending in the arrangement direction.

3 Claims, 7 Drawing Sheets

(51) Int. Cl.
| | |
|---|---|
| *F21S 41/365* | (2018.01) |
| *F21S 41/148* | (2018.01) |
| *G02B 6/00* | (2006.01) |
| *F21S 43/14* | (2018.01) |
| *F21S 43/20* | (2018.01) |
| *F21S 43/239* | (2018.01) |
| *F21S 43/241* | (2018.01) |
| *F21S 43/243* | (2018.01) |
| *F21S 43/249* | (2018.01) |
| *F21Y 115/10* | (2016.01) |
| *F21W 102/20* | (2018.01) |

(52) U.S. Cl.
CPC .............. *F21S 43/14* (2018.01); *F21S 43/239* (2018.01); *F21S 43/241* (2018.01); *F21S 43/243* (2018.01); *F21S 43/249* (2018.01); *F21S 43/26* (2018.01); *G02B 6/00* (2013.01); *F21W 2102/20* (2018.01); *F21Y 2115/10* (2016.08)

(58) Field of Classification Search
CPC ........ F21S 43/00; F21S 43/239; F21S 43/241; F21S 43/26; G02B 6/00; F21Y 2115/10; F21W 2102/20; F21V 2200/00; F21V 2200/20; F21V 2200/13; B60Q 1/02; B60Q 1/04; B60Q 1/24; B60Q 1/26; B60Q 1/2619; B60Q 1/2661; B60Q 1/2665; B60Q 1/34
See application file for complete search history.

(56) References Cited

U.S. PATENT DOCUMENTS

| | | | |
|---|---|---|---|
| 2015/0247613 A1* | 9/2015 | Doha ................... | G02B 6/0018 362/507 |
| 2016/0194954 A1* | 7/2016 | Hay ...................... | E21B 17/028 367/82 |

* cited by examiner

VEHICLE LAMP FITTING

TECHNICAL FIELD

The present invention relates to a vehicle lamp fitting.

The present application claims priority based on Japanese Patent Application No. 2016-054328 filed on Mar. 17, 2016, the contents of which are incorporated herein by reference.

BACKGROUND ART

A technique for causing an entire front surface of a light irradiation section to emit light by guiding light of a light source with a light guide body provided inside a side turn lamp device provided in a door mirror has been disclosed (see Patent Document 1). Further, a technique for reflecting and scattering light through a through-hole provided in the light guide body has been disclosed.

RELATED ART DOCUMENT

Patent Document

Patent Document 1: Japanese Unexamined Patent Application, First Publication No. 2012-206597

SUMMARY

Problems to be Solved by the Invention

However, in the method of total reflection on the side surface of the through-hole, light emitted from the front surface (a surface on the light irradiation section side) of the through-hole decreased, and particularly in a case in which a plurality of light sources are arrayed at intervals, it is difficult to cause the entire light irradiation section to emit light with the same light amount.

Accordingly, an object of the present invention is to provide a vehicle lamp fitting capable of causing the entire light exit surface extending in an arrangement direction of a plurality of light sources to emit light with the same light amount.

Means for Solving the Problem

As means for solving the above problem, aspects of the present invention have the following configuration.

(1) A vehicle lamp fitting according to an aspect of the present invention includes a plurality of arranged light sources, and a light guide body into which light from the plurality of light sources is introduced. The light guide body includes a light entry section into which the light from the plurality of light sources is incident; a light exit surface extending in an arrangement direction of the plurality of light sources; a step-shaped first lens cut section provided between the light entry section and the light exit surface and extending in the arrangement direction; and a step-shaped second lens cut section provided between the first lens cut section and the light exit surface and extending in the arrangement direction.

(2) In the vehicle lamp fitting according to (1) above, the light exit surface may be curved to strengthen an inclination with respect to a left-right direction of a vehicle from an inner side to an outer side of the vehicle in the left-right direction of the vehicle, the first lens cut section and the second lens cut section may have front-rear direction facing surfaces facing each other in a front-rear direction of the vehicle, and the front-rear direction facing surfaces may be formed substantially parallel to each other.

(3) In the vehicle lamp fitting according to (1) or (2) above, the light guide body may include a first recessed section in which the first lens cut section is formed, and a second recessed section in which the second lens cut section is formed, and the first recessed section and the second recessed section may be separated from each other and may be mutually opened in different directions.

Advantage of the Invention

According to the vehicle lamp fitting described in (1) of the present invention, after the light from the plurality of light sources is diffused by the first lens cut section, it is possible to direct the light again in a desired direction by the second lens cut section, and it is possible to cause the entire light exit surface extending in the arrangement direction of the plurality of light sources to satisfactorily emit light with the same amount of light and in the necessary direction, while covering a part in which the amount of light between the plurality of light sources decreases.

According to the vehicle lamp fitting described in the above (2) of the present invention, when the light of the light source passes through the first and second lens cut sections from the light entry section, since the light directed forward can be linearly emitted forward without largely being bent, the amount of light toward the front can be increased compared with a case in which the first and second lens cut sections form facing surfaces in a normal direction (a direction inclined with respect to the front-rear direction of the vehicle due to the bending of the exit surface) of the light exit surface.

According to the vehicle lamp fitting described in the above (3) of the present invention, it is possible to form the first recessed section and the second recessed section individually from different directions, and it is possible to reduce the size of each of the recessed sections and to suppress the reduction in rigidity of the light guide body. That is, when the first recessed section and the second recessed section open in the same direction, it becomes easy for the light guide body to bend toward the side on which the respective recessed sections are opened, but when the recessed sections open in different directions, bending of the light guide body can be suppressed.

DESCRIPTION OF THE EMBODIMENTS

Figure 1:
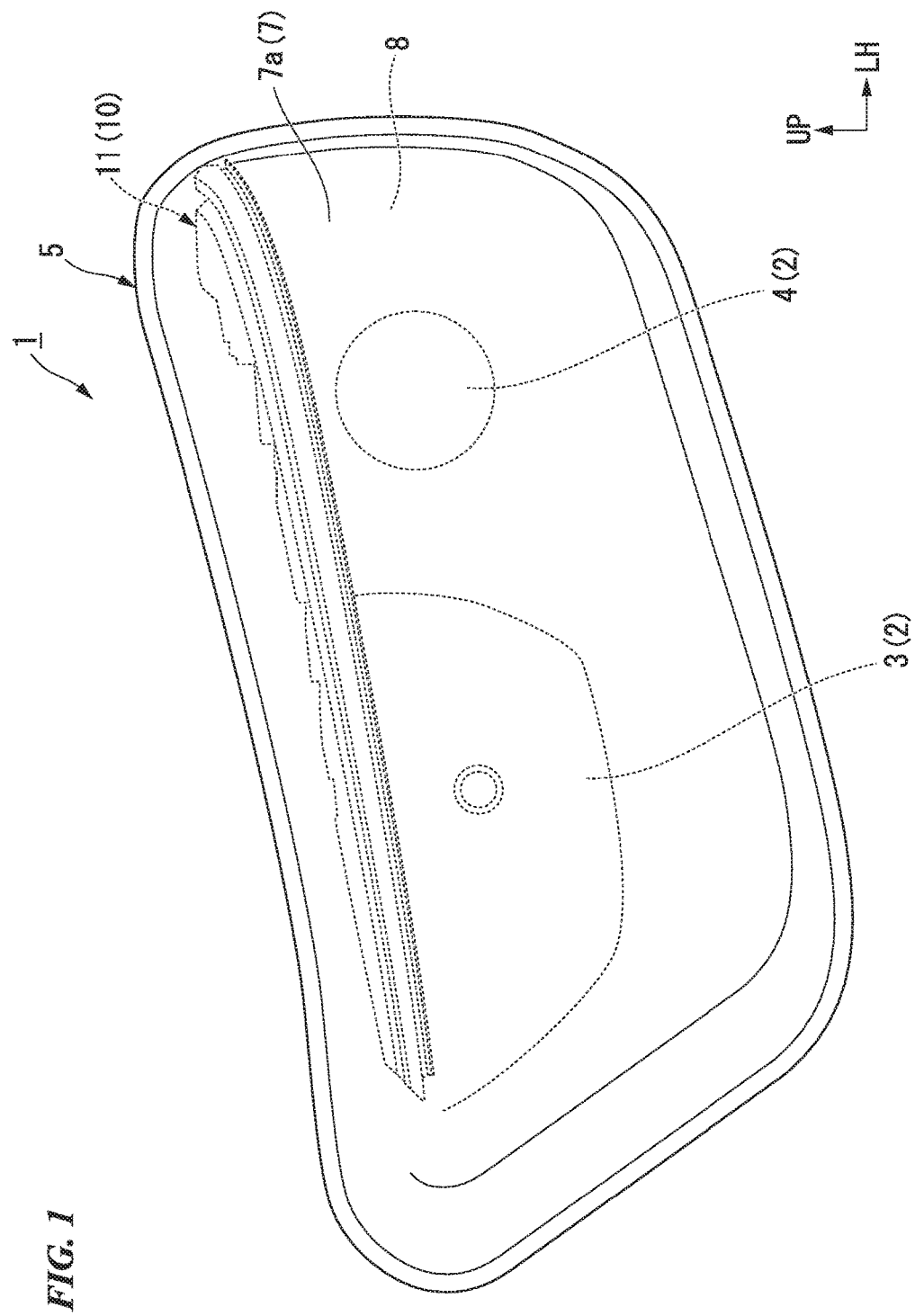
FIG. 1 is a front view of a headlight unit according to an embodiment of the present invention.

Hereinafter, embodiments of the present invention will be described with reference to the drawings. In the following description, directions such as front, back, left and right are the same as those in the vehicle which will be described below unless otherwise noted. Also, an arrow FR indicating the forward direction with respect to the vehicle, an arrow LH indicating the leftward direction with respect to the vehicle, and an arrow UP indicating the upward direction with respect to the vehicle are shown at appropriate positions in the drawings used for the following description.

Figure 3:
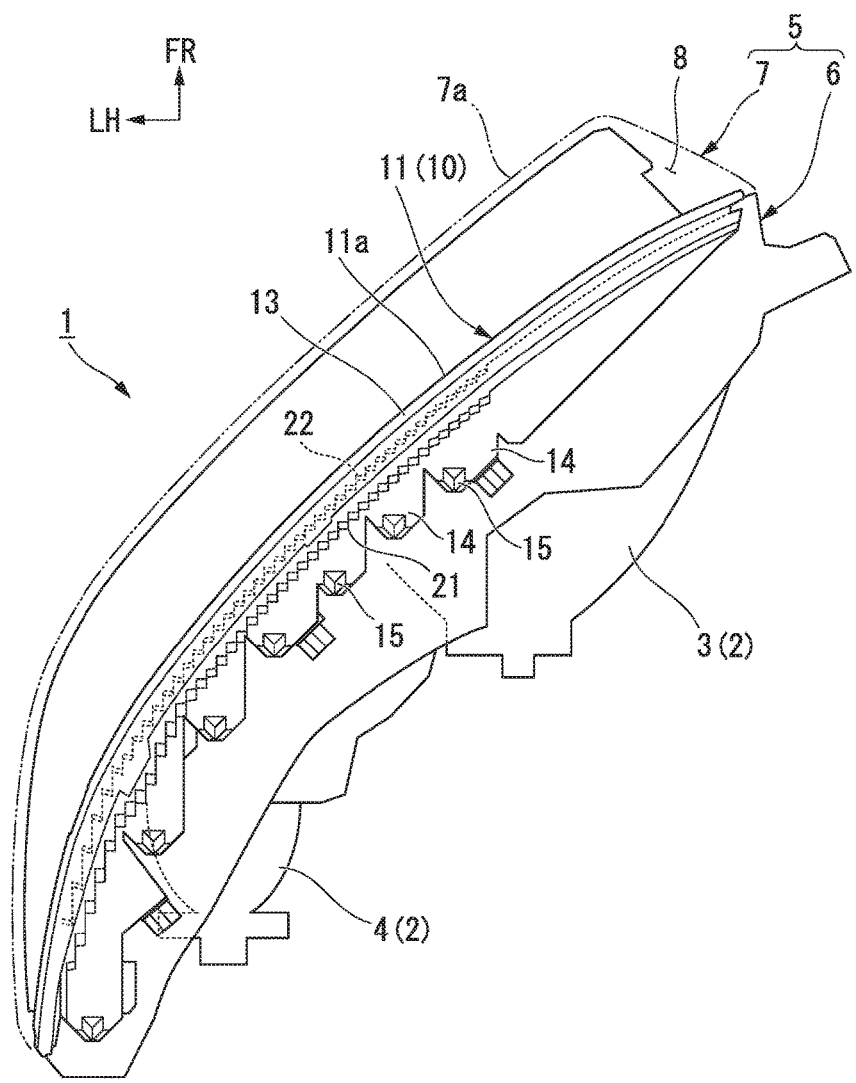
FIG. 3 is a top view of the headlight unit.

As shown in FIGS. 1 and 3, in this embodiment, a turn light (turn signal) 10 on the front side of an automobile is shown as a vehicle lamp fitting. The turn light 10 is integrally provided in a headlight unit 1 including a headlight 2. The headlight unit 1 including the turn light 10 is configured symmetrically with respect to the center of the left and right sides of the vehicle, and in the present embodiment, the unit on the left side of the vehicle is shown and described.

Figure 2:
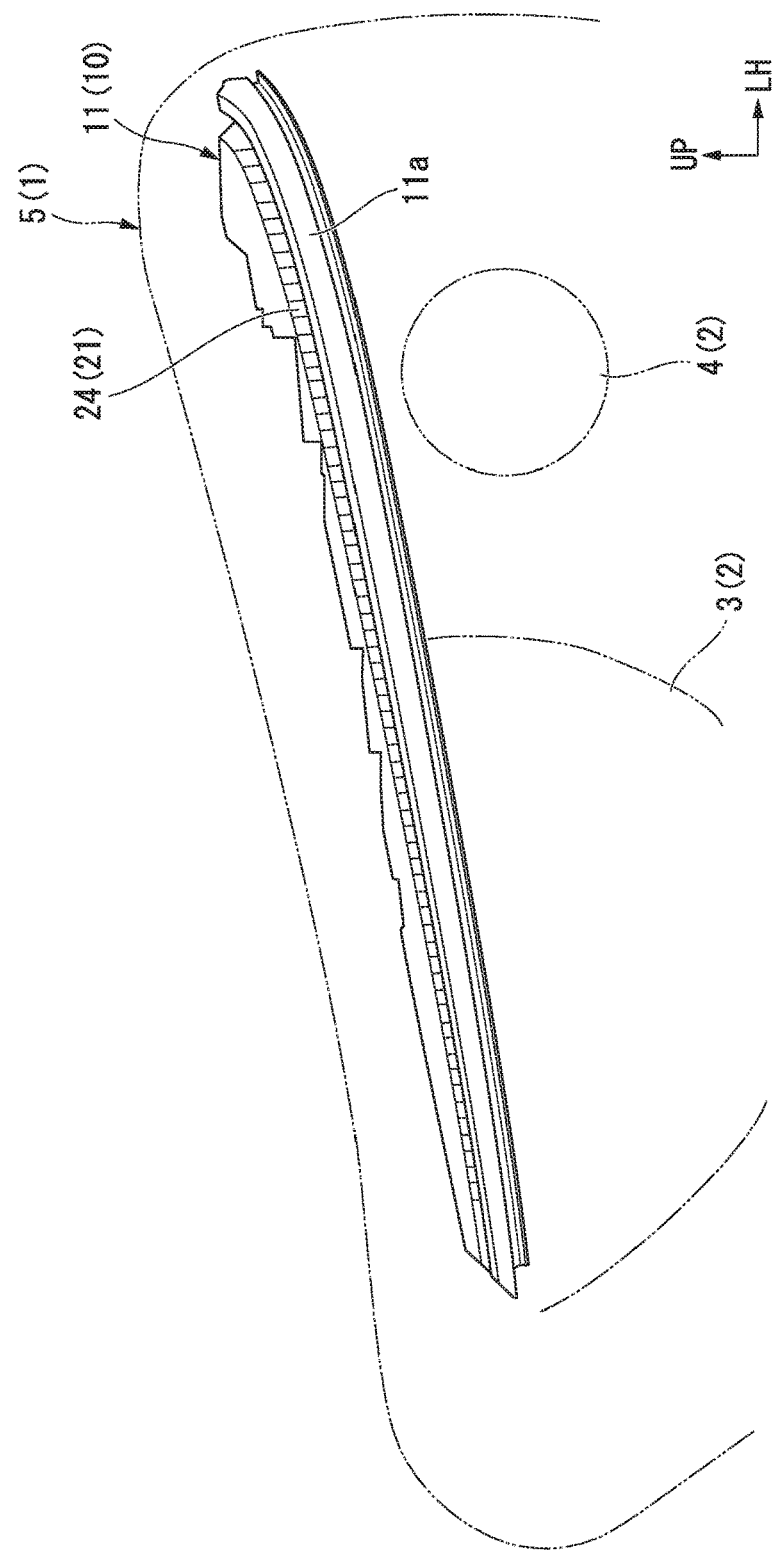
FIG. 2 is a front view of a turn light of the headlight unit.

Referring also to FIG. 2, the headlight unit 1 accommodates the turn light 10 together with a high beam 3, a low beam 4 and the like in a housing 5. The turn light 10 extends in a left-right direction along a linear upper edge portion in a front view of the housing 5.

The housing 5 includes a housing body 6 for supporting a bulb, a reflector and the like of the headlight 2, and a lens cover 7 attached to the housing body 6 from the front. The housing body 6 and the lens cover 7 form a lamp chamber 8 for accommodating a bulb or the like.

The housing 5 (the lens cover 7) forms a curved lens surface 7a that is inclined to be located on the rear side as it goes outward in the left-right direction in the plan view and bulges to protrude forward and to the left and right outer sides. The lens cover 7 forms, for example, a clear lens which is not subjected to lens cutting at a light transmitting section for forming the lens surface 7a.

A lens body (a light guide body) 11 accommodated in the housing 5 is provided in the turn light 10. The lens body 11 is formed in a flat shape with a suppressed vertical width, and is disposed along the inner side of the upper surface of the housing 5. Like the lens surface 7a of the housing 5 in a plan view, the lens body 11 forms an inner lens surface 11a (light exit surface) which is inclined and curved in a plan view. That is, the inner lens surface 11a is curved and formed to enlarge the inclination with respect to the left-right direction of the vehicle from the inner side toward the outer side in the left-right direction of the vehicle. In other words, the inner lens surface 11a is curved from a front surface portion facing the front surface of the vehicle to a side surface portion facing the side surface of the vehicle. When applied to a light body of the rear portion of the vehicle, the inner lens surface 11a is curved from the rear surface portion facing the rear surface of the vehicle to the side surface portion facing the side surface of the vehicle.

Figure 5:
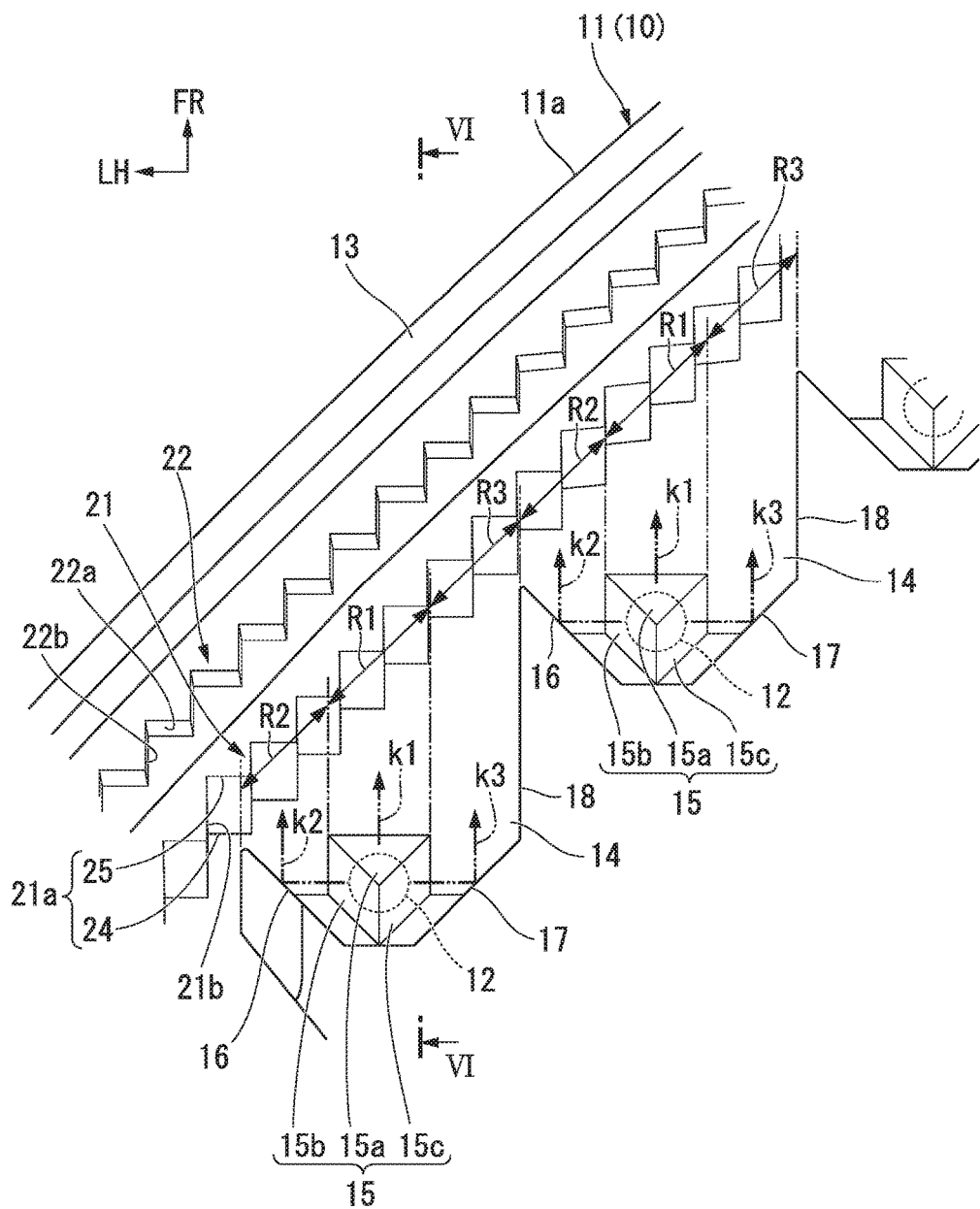
FIG. 5 is an enlarged view of a main part of FIG. 4.

On the lower surface side of the lens body 11, a plurality of LEDs (light emitting diodes) 12 are disposed as light sources of the turn light 10 (see FIG. 5). A prism cut section 15 (a light entry section) is disposed above each LED 12.

Figure 4:
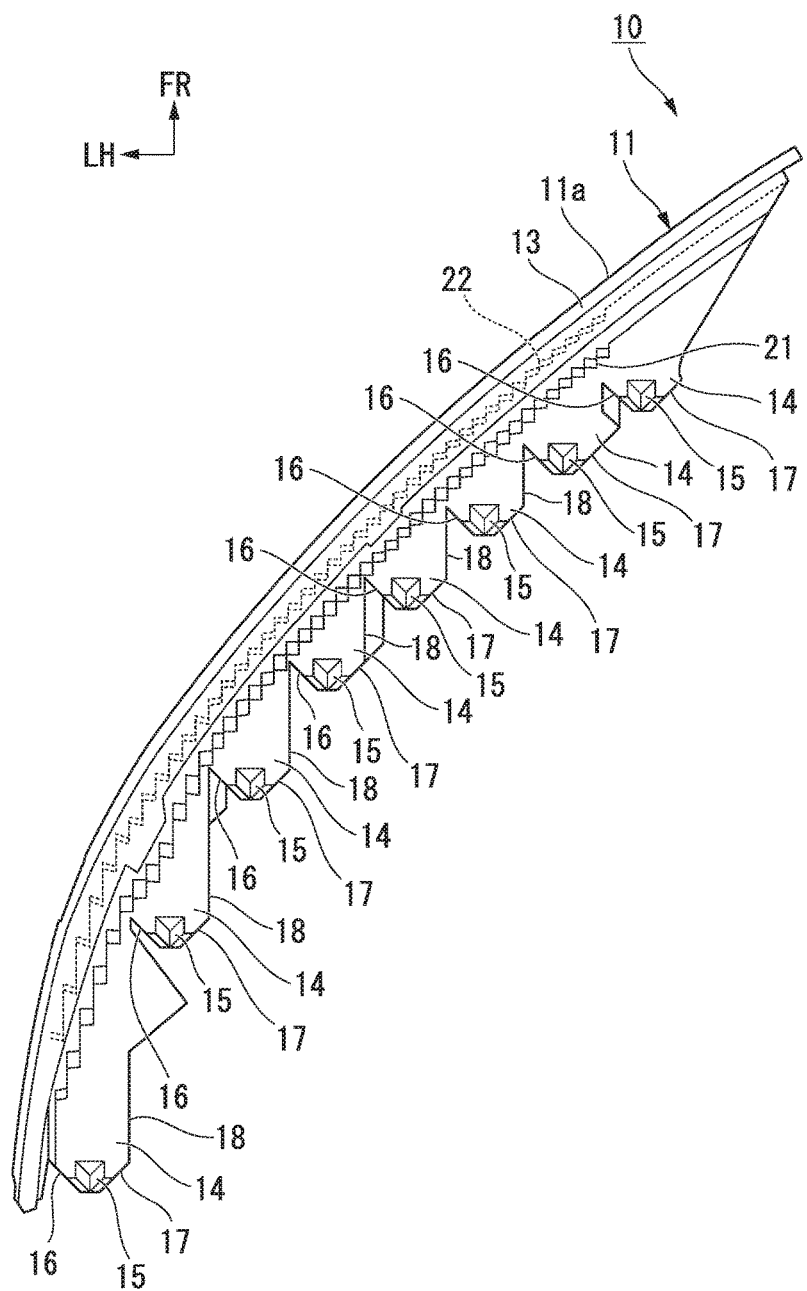
FIG. 4 is a top view of the turn light.

Referring also to FIG. 4, the plurality of LEDs 12 and the prism cut section 15 are disposed side by side in a stepped shape to follow the inclination and curvature of the inner lens surface 11a in a plan view. The plurality of LEDs 12 are disposed to be equally spaced apart individually in the left-right direction and are disposed to widen the individual intervals to the left and right outer side by the curvature of the inner lens surface 11a in the front-rear direction.

A diffusive light distribution section 13 extending along the inner lens surface 11a is provided in the lens body 11. The plurality of LEDs 12 and the prism cut section 15 are disposed to be separated from each other behind the diffusive light distribution section 13. The plurality of light distribution sections 14 protrude toward the upper side (the prism cut section 15) of each LED 12 behind the diffusive light distribution section 13. The lens body 11 is in a state in which the plurality of light distribution sections 14 are caused to protrude from the rear side of the diffusive light distribution section 13 toward each LED 12 (the prism cut section 15).

Figure 6:
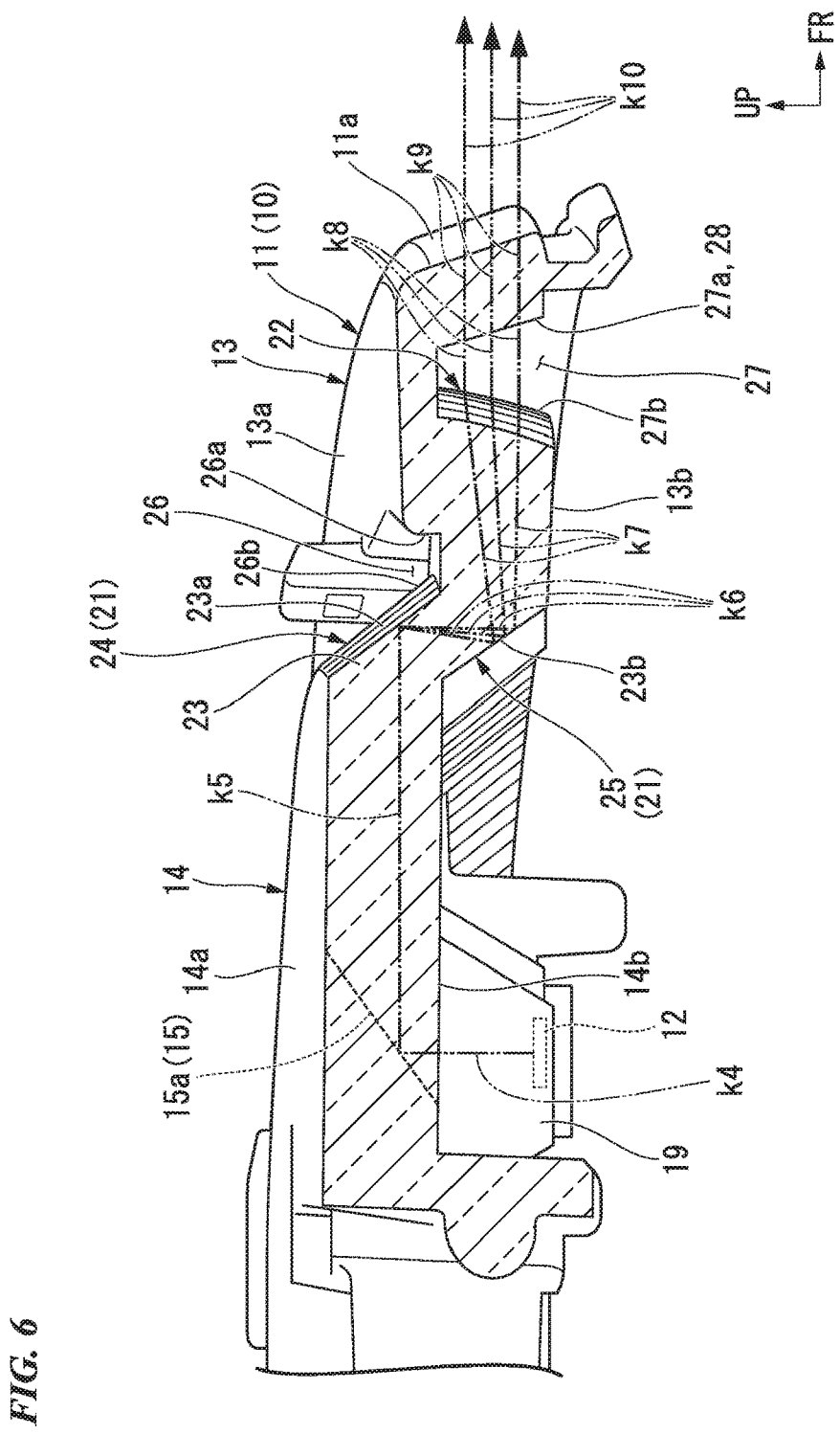
FIG. 6 is a cross-sectional view taken along the line VI-VI of FIG. 5.

As shown in FIGS. 4 to 6, the light distribution sections 14 form the prism cut section 15 located above the corresponding LED 12 (overlapping in a top view), and left and right reflection surfaces 16 and 17 located on the left and right sides of the prism cut section 15.

The prism cut section 15 forms planar light distribution surfaces 15a, 15b and 15c on three peripheral sides (front, right, and left sides) of the LED 12 in a plan view. Specifically, the prism cut section 15 forms a front light distribution surface 15a that is substantially orthogonal to the front-rear direction in a plan view, and left and right side light distribution surfaces 15b and 15c that are substantially orthogonal to the left-right direction in a plan view. By the three light distribution surfaces 15a, 15b and 15c, the light of the LED 12 radiated to the upper side (the side of the prism cut section 15) from the LED 12 is distributed to the front side, the left side and the right side.

The diffusive light distribution section 13 includes a step-shaped first lens cut section 21 that is provided between the prism cut section 15 and the inner lens surface 11a and extends in the arrangement direction of the plurality of LEDs 12, and a step-shaped second lens cut section 22 that is provided between the first lens cut section 21 and the inner lens surface 11a and extends in the arrangement direction.

The light distributed toward the front of the vehicle from the front light distribution surface 15a of the prism cut section 15 is distributed to a front light distribution region R1 located in front of the prism cut section 15 in the first lens cut section 21 (see an arrow k1 in FIG. 5).

The light distributed to the left side from the left side light distribution surface 15b of the prism cut section 15 is reflected by a standing wall reflection surface of the left and right reflection surface 16 on the left side of the prism cut section 15 and is distributed toward the front of the vehicle (see an arrow k2 in FIG. 5). As a result, light is also distributed to the left side light distribution region R2 adjacent to the left side of the front light distribution region R1 in the first lens cut section 21.

The light distributed to the right side from the right side light distribution surface 15c of the prism cut section 15 is reflected by a rear wall reflection surface of the left and right reflection surface 17 on the right side of the prism cut section 15 and is distributed toward the front of the vehicle (see an arrow k3 in FIG. 5). As a result, light is also distributed to the right side light distribution region R3 adjacent to the right side of the front light distribution region R1 in the first lens cut section 21.

On the further right side of the rear wall reflection surface of the left and right reflection surface 17, a light distribution section side surface 18 substantially parallel to the front-rear direction is formed. Since the light distribution section side surface 18 is substantially parallel to the front-rear direction, the light distribution section side surface 18 does not block light reflected from the rear wall reflection surface of the left and right reflection surface 17 toward the front of the vehicle.

Each of the first and second lens cut sections 21 and 22 is formed in a zigzag shape to form a stepped shape in a plan view. Each of the first and second lens cut sections 21 and 22 forms a plurality of front-rear direction facing surfaces 21a and 22a substantially orthogonal to the front-rear direction of the vehicle, and a plurality of upright surfaces 21b and 22b which stand upright rearward substantially in parallel to the front-rear direction of the vehicle from the left and right outer ends of each of the front-rear direction facing surfaces 21a and 22a and extend to the left and right inner ends of the front-rear direction facing surfaces 21a and 22a adjacent to the left and right outer sides. The front-rear direction facing surfaces 21a and 22a are surfaces extending in the vertical direction and the left-right direction, and the upright surfaces 21b and 22b are surfaces extending in the vertical direction and the front-rear direction.

Referring to FIG. 6, in the cross section intersecting with a longitudinal direction (the arrangement direction) of the lens body 11, the diffusive light distribution section 13 located on the front side of the lens body 11 forms upper and lower general surfaces 13a and 13b substantially parallel to each other. Each of the light distribution sections 14 on the rear side of the diffusive light distribution section 13 is displaced upward with respect to the diffusive light distribution section 13 via the inclined section 23. Each light distribution section 14 forms rear upper and lower surfaces 14a and 14b which are substantially parallel to each other.

A protrusion 19 protruding downward from the rear lower surface 14b is formed on the lower side of each light distribution section 14. A chip-shaped LED 12 is installed on the lower surface side of the protrusion 19. The LED 12 faces a directivity direction (a main light emission direction) upward. Light of the LED 12 in the directivity direction is irradiated to the prism cut section 15 and appropriately distributed (see arrows k4 and k5 in FIG. 6).

The inclined section 23 forms vertically inclined surfaces 23a and 23b substantially parallel to each other. An upper lens cut section 24 and a lower lens cut section 25 forming the first lens cut section 21 are formed on the vertically inclined surfaces 23a and 23b, respectively. The upper lens cut section 24 and the lower lens cut section 25 form, for example, upper and lower front-rear direction facing surfaces 21a slightly different in angle from each other.

Figure 7:
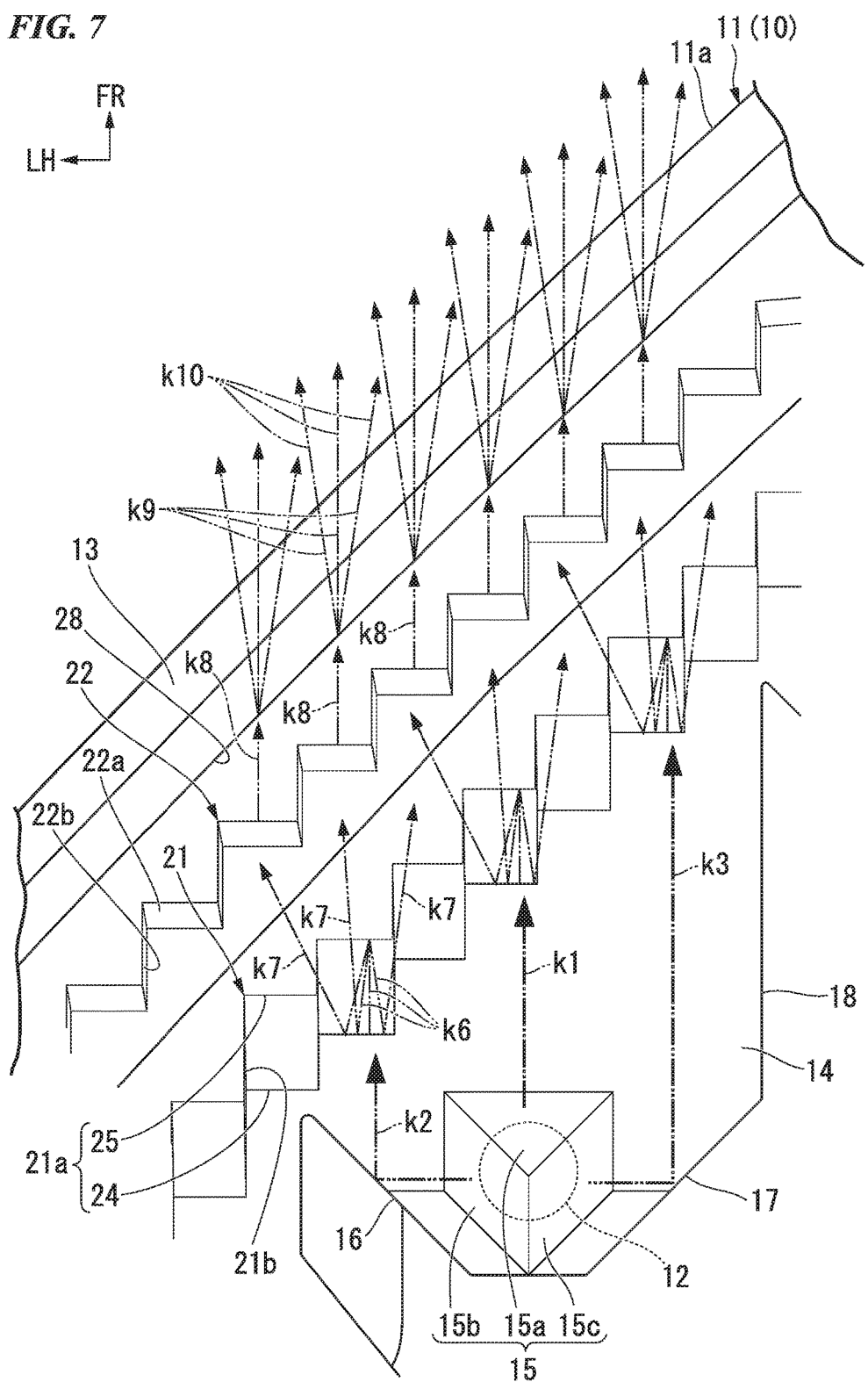
FIG. 7 is a top view showing the operation of the present embodiment.

Referring also to FIG. 7, the upper lens cut section 24 and the lower lens cut section 25 appropriately bend, reflect and diffuse the light distributed from the prism cut section 15 directly or via the left and right reflection surfaces 16 and 17 within the inclined section 23 (see an arrow k6 in FIGS. 6 and 7).

Referring to FIG. 6, a relatively shallow first recessed section 26 recessed downward with respect to the upper general surface 13a is formed on the upper rear side of the diffusive light distribution section 13. A relatively deep second recessed section 27 recessed upward with respect to the lower general surface 13b is formed on the lower front side of the diffusive light distribution section 13.

A front inner surface of the first recessed section 26 is an upright surface 26a substantially parallel to the vertical direction, and a rear inner surface of the first recessed section 26 is an inclined face 26b formed by extending the lower portion of the upper inclined surface 23a of the inclined section 23. That is, at least a part of the upper inclined surface 23a of the inclined section 23 (in other words, the upper lens cut section 24 of the first lens cut section 21) is formed by the first recessed section 26.

The front and rear inner surfaces of the second recessed section 27 are formed as front and rear inclined surfaces 27a and 27b inclined to narrow the front-rear width of the second recessed section 27 toward the upper side. A second lens cut section 22 is formed on the rear inclined surface 27b of the second recessed section 27. On the front inclined surface 27a of the second recessed section 27, a diffusing lens cut section (a flute cut lens, a diffusing surface, and a longitudinal groove section) 28 in the form of a longitudinal groove is formed to intersect with the longitudinal direction of the lens surface and extend substantially in parallel with the vertical direction.

Referring to FIGS. 6 and 7, the light having passed through the first lens cut section 21 is further diffused, while passing through the inside of the diffusive light distribution section 13 (see an arrow k7 in FIGS. 6 and 7), and is emitted to the outside of the lens body 11 (into the second recessed section 27) (see an arrow k8 in FIGS. 6 and 7). At that time, the light is redirected to the front of the vehicle by the second lens cut section 22. After that, the light is further diffused in the longitudinal direction of the inner lens surface 11a (see an arrow k9 in FIGS. 6 and 7) by passing through the diffusing lens cut section 28, and then is distributed toward the vehicle front side from the inner lens surface 11a (see an arrow k10 in FIGS. 6 and 7).

Next, the operation will be described.

The light irradiated upward (to the prism cut section 15 side) from the LED 12 is distributed to the front and left and right sides at the respective light distribution surfaces 15a, 15b and 15c of the prism cut section 15. The light distributed toward the front of the vehicle by the front light distribution surface 15a is distributed to the front light distribution region R1 in front of the prism cut section 15 in the first lens cut section 21. The light distributed to the left and right sides by the left and right side light distribution surfaces 15b and 15c is distributed to the front of the vehicle by the left and right reflection surfaces 16 and 17, and then is distributed to the left and light distribution regions R2 and R3 of the front light distribution region R1 in the first lens cut section 21. The light distributed to the first lens cut section 21 is further diffused by the first lens cut section 21 to widen the light distribution region.

The light diffused by the first lens cut section 21 forms an optical path directed toward the front by the front-rear direction facing surface 22a of the second lens cut section 22 in the valley section (the second recessed section 27) of the lens body 11 (see an arrow k8 in FIGS. 6 and 7).

The light directed toward the front in the second recessed section 27 is diffused in the longitudinal direction of the inner lens surface 11a by the flute cut lens, and causes the inner lens surface 11a to uniformly emit light in the longitudinal direction.

In this way, the light of the LED 12 is sufficiently diffused to supplement the light emission of the lens surface between the LEDs 12, and then allows uniform light emission directed toward the front of the vehicle.

That is, the light of the LED 12 is further diffused by the first lens cut section 21 after expanding the light distribution region in the first lens cut section 21 by the prism cut section 15 and the left and right reflection surfaces 16 and 17 above the LED 12, and after that, the light is redirected to the front of the vehicle by the second lens cut section 22. Accordingly, light is effectively diffused by the first lens cut section 21. Therefore, the light distribution between the plurality of LEDs 12 can be supplemented to suppress insufficient light distribution, and uniform light emission of the inner lens surface 11a can be performed.

In addition, since the LED 12 installed on the lower surface of the lens body 11 causes the inner lens surface 11a to emit light via the prism cut section 15 and the plurality of lens cut sections 21 and 22, it is difficult for the LED 12 to visually observe even from the inner lens surface 11a, thereby improving the appearance, and it is possible to suppress the direct light from the LED 12 and cause the inner lens surface 11a to uniformly emit light. Further, by disposing the LED 12 in the thickness direction (vertical direction) of the lens body 11, it is possible to miniaturize the lens body 11 particularly in the front-rear direction which is the light distribution direction. In addition, since the lens body 11 forms an optical path extending in the vertical direction, it is possible to efficiently secure the optical path length and to satisfactorily perform the diffusion and light distribution.

Further, by forming the lens body 11 as a whole in an inclined shape in a plan view and by forming the step-shaped lens cut sections 21 and 22 in accordance with the inclination, it is possible to cause the inner lens surface 11a to uniformly emit light by the light directed toward the front of the vehicle from the plurality of stages of the front-rear direction facing surfaces 21a and 22a of the lens cut sections 21 and 22.

In this way, the light of the LED 12 having high directivity can be diffused in a wide range by the compact lens body 11 and can be distributed to the front of the vehicle, and the light emitting area of the inner lens surface 11a can be effectively expanded.

As described above, the vehicle lamp fitting according to the above embodiment includes a plurality of arranged LEDs 12 and a lens body 11 into which the lights of the plurality of LEDs 12 are introduced, and the lens body 11 includes a prism cut section 15 into which the lights of the plurality of LEDs 12 are incident, an inner lens surface 11a extending in the arrangement direction of the plurality of LEDs 12, a step-shaped first lens cut section 21 provided between the prism cut section 15 and the inner lens surface 11a and extending in the arrangement direction, and a step-shaped second lens cut section 22 provided between the first lens cut section 21 and the inner lens surface 11a and extending in the arrangement direction.

According to this configuration, after the light from the plurality of LEDs 12 is diffused by the first lens cut section 21, it is possible to direct the light again in a desired direction by the second lens cut section 22, and, it is possible to cause the entire inner lens surface 11a extending in the arrangement direction of the plurality of LEDs 12 to satisfactorily emit light with the same amount of light and in the necessary direction, while covering a part in which the amount of light between the plurality of LEDs 12 decreases.

Further, in the vehicle lamp fitting, the inner lens surface 11a is curved to intensify the inclination with respect to the left-right direction of the vehicle from the inner side to the outer side in the left-right direction of the vehicle, the first lens cut section 21 and the second lens cut section 22 have front-rear direction facing surfaces 21a and 22a that face each other in the front-rear direction of the vehicle, and the front-rear direction facing surfaces 21a and 22a are formed substantially in parallel to each other.

According to this configuration, when the light of the LED 12 passes through the first and second lens cut sections 21 and, 22 from the prism cut section 15, since the light directing forward can be linearly emitted forward without largely being bent, the amount of light toward the front can be increased compared with a case in which the first and second lens cut sections 21 and 22 form facing surfaces in a normal direction of the inner lens surface 11a.

Further, in the vehicle lamp fitting, the lens body 11 includes the first recessed section 26 in which the first lens cut section 21 is formed, and the second recessed section 27 in which the second lens cut section 22 is formed, and the first recessed section 26 and the second recessed section 27 are separated from each other and are mutually opened in different directions.

According to this configuration, it is possible to form the first recessed section 26 and the second recessed section 27 individually from different directions, and it is possible to reduce the size of each of the recessed sections 26 and 27 and to suppress the reduction in rigidity of the lens body 11. That is, when the first recessed section 26 and the second recessed section 27 are opened in the same direction, the lens body 11 becomes easy to bend toward the side on which the recessed sections 26 and 27 are opened, but by opening the recessed sections 26 and 27 in different directions, bending of the lens body 11 can be suppressed.

It should be noted that the present invention is not limited to the above embodiment, for example, but may be applied to any vehicle lamp fitting such as a headlight, a taillight, a fog light, a backlight and the like besides a turn light.

The configuration in the above embodiment is an example of the present invention, and various modifications can be made without departing from the gist of the present invention, such as replacing the constituent elements of the embodiment with well-known constituent elements.

BRIEF DESCRIPTION OF THE REFERENCE SYMBOLS

10: Turn light (vehicle lamp fitting)
11: Lens body (light guide body)
11a: Inner lens surface (light exit surface)
12: LED (light source)
15: Prism cut section (light entry section)
21: First lens cut section
21a: Front-rear direction facing surface
22: Second lens cut section
22a: Front-rear direction facing surface
26: First recessed section
27: Second recessed section

What is claim is:
1. A vehicle lamp fitting comprising:
a plurality of arranged light sources and a light guide body into which light from the plurality of light sources is introduced, wherein:
the light guide body includes:
a light entry section into which the light from the plurality of light sources is incident;
a light exit surface extending in an arrangement direction of the plurality of light sources;
a step-shaped first lens cut section provided between the light entry section and the light exit surface and extending in the arrangement direction;
a step-shaped second lens cut section provided between the first lens cut section and the light exit surface and extending in the arrangement direction; and
a first recessed section in which the first lens cut section is formed, and a second recessed section in which the second lens cut section is formed,
the first recessed section and the second recessed section are separated from each other and are mutually opened in different directions,
the light guide body is formed in a flat shape with a suppressed vertical width,
in a front-rear direction, the light entry section, the first lens cut section, the second lens cut section, and the light exit surface are arranged in order,
the first recessed section and the second recessed section are separated from each other in the front-rear direction, the first recessed section and the second recessed section are mutually opened in different directions in a vertical direction.

2. The vehicle lamp fitting according to claim 1, wherein the light exit surface is curved to strengthen an inclination with respect to a left-right direction of a vehicle from an inner side to an outer side of the vehicle in the left-right direction of the vehicle, the first lens cut section and the second lens cut section have front-rear direction facing surfaces facing each other in a front-rear direction of the vehicle, and the front-rear direction facing surfaces are formed substantially parallel to each other.

3. The vehicle lamp fitting according to claim 1, wherein:

the light sources irradiate the light upward, the light entry section is disposed above the light sources, the light entry section distributes the light radiated from the light sources to a front side, a left side and a right side, the first recessed section is recessed downward, and the second recessed section is recessed upward.

* * * * *